United States Patent [19]
Onishi et al.

[11] Patent Number: 5,358,273
[45] Date of Patent: Oct. 25, 1994

[54] INFLATABLE BAGS FOR AIRBAG PASSIVE RESTRAINT SYSTEMS FOR DRIVER AND METHOD FOR PRODUCTION THEREOF

[75] Inventors: Osamu Onishi, Akashi; Toru Ozaki, Toyota; Hidehito Sogi; Shigeyoshi Fukushima, both of Nagoya; Koji Sugiura, Kasugai; Atsushi Onoda, Nagoya, all of Japan

[73] Assignee: Toyo Tire & Rubber Co., Ltd., Osaka, Japan

[21] Appl. No.: 17,874

[22] Filed: Feb. 16, 1993

[30] Foreign Application Priority Data

| Mar. 9, 1992 | [JP] | Japan | 4-021400[U] |
| Mar. 9, 1992 | [JP] | Japan | 4-021401[U] |
| Mar. 9, 1992 | [JP] | Japan | 4-086541 |
| Mar. 9, 1992 | [JP] | Japan | 4-086542 |

[51] Int. Cl.⁵ ............................................. B60B 21/20
[52] U.S. Cl. .................... 280/743 R; 280/728 R; 280/729; 280/731
[58] Field of Search ........... 280/743 R, 728 R, 743 A, 280/729, 731

[56] References Cited

U.S. PATENT DOCUMENTS

| 3,476,402 | 11/1969 | Wilfert | 280/729 |
| 3,733,091 | 5/1973 | Fleck et al. | 280/729 |
| 3,752,501 | 8/1973 | Daniel et al. | 280/731 |
| 4,300,894 | 11/1981 | Cumming et al. | 280/729 X |
| 5,022,675 | 6/1991 | Zelenak, Jr. et al. | 280/743 R |
| 5,044,663 | 9/1991 | Seizert | 280/743 R |
| 5,078,423 | 1/1992 | Fujita | 280/728 R X |
| 5,190,313 | 3/1993 | Hickling | 280/731 |
| 5,253,892 | 10/1993 | Satoh | 280/731 |

Primary Examiner—Kenneth R. Rice
Assistant Examiner—Christopher P. Ellis
Attorney, Agent, or Firm—Flynn, Thiel, Boutell & Tanis

[57] ABSTRACT

An inflatable bag for airbag passive restraints for driver which comprises upper and lower circular base cloths of the same size seamed together at their outer peripheries and lateral regulating means for regulating inflation of the bag in lateral and upward directions and causing downward inflation, which means extends to link between an inner periphery of the lower base cloth and the outer peripheries in a shorter length than the radial distance therebetween, thus forming a sag portion on the lower cloth. When the bag is deployed, the lateral regulating means enables the sag portion to bulge sideways out of a steering wheel to protect a driver. The bag may further include upward restricting means for upward inflation. The lateral and the upward regulating means may be located in a whole circumferential area or within a range of ½ to ¼ the circumference of both cloths. A method of producing the bag having lateral or both regulating means is characterized by using a third cloth of the same size having strap-like portion or portions defined by communicating hole or holes. After superposing and sewing of the lower, upper and third cloths, the strap-like portions are each raised and folded into two and sewn at two roots, thus forming the lateral means. Then the folded strap-like portions are cut at one root and the unfolded strap ends are sewn to the upper base cloth to form upward strap members.

13 Claims, 8 Drawing Sheets

INFLATABLE BAGS FOR AIRBAG PASSIVE RESTRAINT SYSTEMS FOR DRIVER AND METHOD FOR PRODUCTION THEREOF

BACKGROUND OF THE INVENTION

1. Field of the Invention

This invention relates to inflatable bags for use in airbag passive restraint systems that are mounted forwardly of driver's seats of vehicles and adapted to be inflated automatically and instantaneously in case of a collision accident of the vehicle, thereby to restrain movement of the seated occupant and to protect the occupant, and to a method of manufacturing them. More particularly, the invention is directed to inflatable bags which are regulated in the directions of deployment and improved in the deployed configuration when inflated, and their manufacture.

2. Description of Related Art

Air bag passive restraint systems for vehicles are to restrain movement of a passenger or seated occupant and to protect the person by instantaneous inflation of the bag and its shock-absorbing ability in case of collision of the vehicle at an impact of more than a predetermined magnitude, thus acting as an auxiliary to seat belts. Generally, an air bag passive restraint systems is made up of an inflator for releasing gas, e.g. nitrogen, a bag to be inflated by the gas released, a housing enclosing therein air-tightly the inflator and bag, and a sensor detecting an impact of more than a predetermined magnitude and transmitting a signal to the inflator. A typical inflatable bag comprises two upper and lower base cloths of the same circular form seamed together at the outer peripheries, the lower base cloth having an opening through which to communicate with the inflator. An improved bag is also known, which is further provided with strip pieces for regulating excessive upward flaring of the bag, which pieces extend from an inner periphery of the lower cloth to the upper cloth, thereby avoiding hitting of the occupant on the head and thorax by the flared bag itself.

When the air bag passive restraint is brought into operation, the gas released from the inflator is filled into the bag and housing to exert an inner pressure upon the wall face of the bag, which urges to inflate and fully deploy the bag.

With known air bag passive restraint systems for driver, the inflator is embedded in the central part of a steering wheel and the inflatable bag is, upon operation, inflated to flare in a mushroom form over the circumference of the steering wheel thereby to protect the occupant in such a manner that the inflated bag is interposed between the steering wheel and the occupant. With the aforesaid airbag passive restraints for driver, their inflatable bags, mostly comprising two- or multi- compartment type bags, were deployed over the steering wheel, but not in a manner wrapping successfully the outer circumference of the steering wheel therein.

On the other hand, a conventional method for manufacturing the aforesaid existing bag necessitated a multiplicity of parts such as the strip pieces and accordingly, required laborious sewing work of them to many seaming places. As a result, the method required much time and skill and was not efficient.

In view of the problems above, it is a primary object of this invention to provide air bag passive restraint systems for driver, particularly inflatable bags thereof improved in the deployed configuration which bags are formed of a single bag (with no compartment) and can be deployed in a manner enveloping satisfactorily the steering wheel therein.

It is another object of this invention to provide a method of manufacturing inflatable bags for air bag passive restraints, which method enables a simple and efficient procedure.

SUMMARY OF THE INVENTION

One aspect of this invention suited to the foregoing objects resides in an inflatable bag for airbag passive restraint systems for driver comprising an upper base cloth adapted to face toward the occupant and a lower base cloth having a central opening through which to communicate with an inflator of the systems, both base cloths having the same size and generally circular form and being seamed together at their outer peripheral portions, which bag is provided therein with lateral regulating means for regulating the inflation of the bag in the lateral and upward directions so as to cause downward inflation of the bag, the lateral regulating means having a shorter length than the radial distance between an inner peripheral portion around the opening of the lower base cloth and the outer peripheral portions of both cloths, the lateral regulating means extending radially to connect the inner peripheral portion of the lower base cloth and the outer peripheral portions to form a circumferential sag portion on the lower base cloth. The lateral regulating means may be a single strap member partly circumferentially disposed or strap members which are partly or wholly circumferentially disposed in a circumferentially spaced relation. In case where the strap member or members are partly circumferentially disposed, they are preferably within the range of one half to one fourth the circumference of both cloths.

Since the gas released from the inflator naturally goes upwardly into the bag, there is a tendency of the bag toward excessive upward extension. In view of the tendency, in a preferred embodiment of this invention, an inflatable bag of this invention is further provided therein with upward regulating means for restricting upward extension of the bag, which means is a strap member or members extending from the inner peripheral port ion of the lower base cloth upwardly to the upper base cloth, around a central circular portion thereof. The upward regulating strap member or members may be disposed wholly circumferentially or partly circumferentially in a circumferentially spaced relation. In the latter case, the upward regulating strap member or members are preferably disposed within the range of ½ to ¼ the circumference of the both cloths and in the same circumferential area as the lateral regulating means.

Here, the term "strap member(s)" used throughout the specification and claims means, in a broad sense, straps, bands, strips, tapes or the like assuming a rectangular or more or less trapezoid form. In case where the lateral regulating means and upward regulating means are each a single strap member or a few strap members or partly circumferentially disposed, they can assume either a rectangular form or a trapezoid form.

According to another aspect of this invention, there is provided a method of manufacturing an inflatable bag having the lateral regulating means or an inflatable bag having both regulating means as stated above, which method can be performed in a simple and efficient procedure, by using, as a starting material, the upper and lower base cloths stated above and a third cloth for making therefrom the lateral regulating means or both regulating means, which cloth has the same form and size as both cloths and the same central opening as the lower base cloth and comprises a strap-like portion or portions and communicating hole or holes defined on both elongate sides of the strap-like portion (s). That is, a method of producing an inflatable bag having both lateral and upward regulating means comprises (a) superposing the third cloth on the lower base cloth at its reverse side and seaming inner peripheral portions of the two around the openings to each other; (b) superposing the lower base cloth on the upper base cloth so that the obverse side of the former may face the obverse side of the latter and seaming outer peripheral portions of the three cloths together; (c) picking up and raising the strap-like portion(s) of the third cloth to fold each of them in a circumferential direction into two and seaming each of the folded strap-like portion (s) at two roots thereof, thus forming the lateral regulating strap member(s); (d) cutting each one root of the folded strap-like portion (s) to form unfolded strap(s) and seaming each free end of the unfolded strap(s) to a central circular portion of the upper base cloth at its reverse side in a spaced relation, thereby forming the upward regulating strap member(s); and subsequently, (e) turning the obverse sides of the upper and lower base cloths inside out.

On the other hand, a method of producing an inflatable bag having lateral regulating means comprises (a) superposing the third cloth on the lower base cloth at its reverse side and seaming inner peripheral portions of the two to each other; (b) superposing the lower base cloth on the upper base cloth so that the obverse side of the former may face the obverse side of the latter and seaming outer peripheral portions of the three cloths together; (c) picking up and raising the strap-like portion (s) of the third cloth to fold each of them in a circumferential direction into two and seaming each of the folded strap-like portion(s) at two roots thereof, thus forming the lateral regulating strap member(s); and finally (e) turning the obverse sides of the upper and lower base cloths inside out.

According to the inflatable bags of this invention, a lateral regulating strap member or members link the inner and outer peripheral portions of both cloths together in a mutually opposing manner, thereby forming a circumferentially extending sag portion on the lower base cloth. As a consequence, when the bag is fully deployed, the sag portion is bulged sideways out of the steering wheel in a donut form to surround the outer circumference of it or in a partial donut form on the occupant's seat side.

In accordance with the method of manufacturing an inflatable bag having lateral regulating means or a bag having both lateral and upward regulating strap members pertaining to another aspect of this invention, it is possible to effectively take advantage of an existing production line for airbag in order to conduct sewing process of the third cloth to both cloths. That is to say, in the sewing step of a reinforcing cloth on the inner peripheral port ion of the lower base cloth, step (a) can be performed simultaneously; in the sewing step of the upper and lower base cloths at their outer peripheral portions, step (b) above can be simultaneously performed. In order to attach the lateral regulating means, e.g. strap members, it is sufficient to sew each one place (two roots) of the doubled strap-like portion per one strap member in step (c) whereas for each one upward regulating strap member, it is sufficient to sew the cut end of the strap-like portion to the upper base cloth in step (d). Thus it is required to sew only two places of the strap-like portion per one lateral and one upward regulating strap members in steps (c) and (d).

According to the known procedure for manufacturing a bag having upward regulating strap members, it has been necessary to sew two places per one upward strap member and further to use a multiplicity of materials. In contrast, the production of the bags having lateral regulating means according to this invention enables to reduce greatly the laborious sewing work and the material number required. Hence, the method of this invention can be performed efficiently and simply in spite of a large number of the members.

BRIEF DESCRIPTION OF THE DRAWINGS

The invention will be hereinbelow described in greater detail with reference to the accompanying drawings.

DESCRIPTION OF THE PREFERRED EMBODIMENTS

Figure 1:
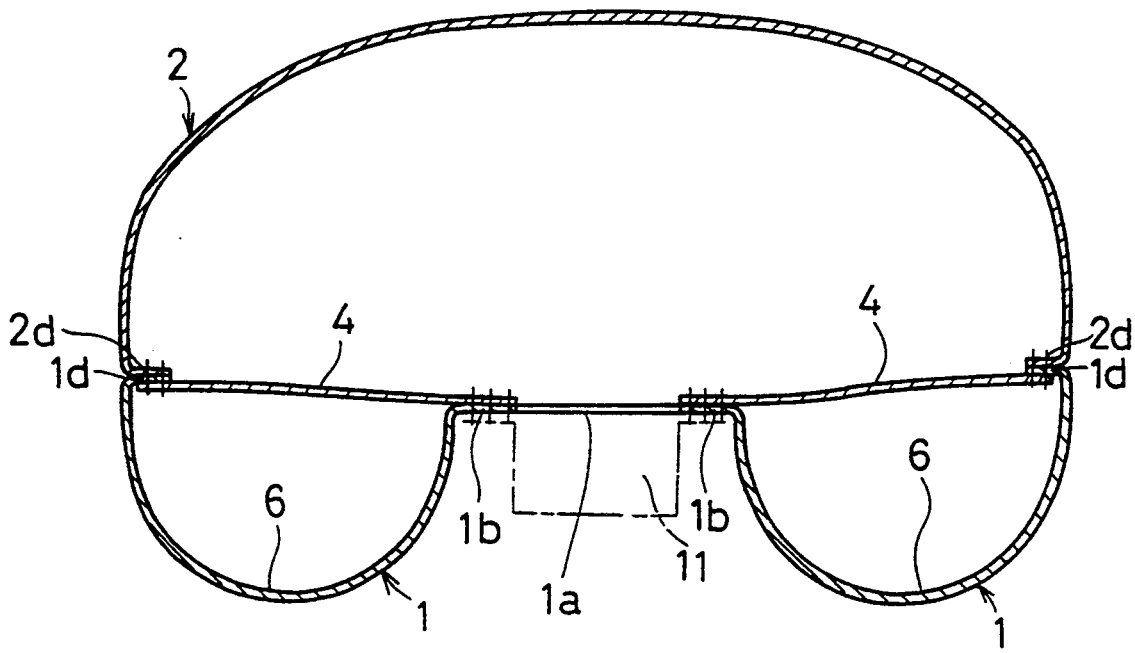
FIG. 1 is a vertical sectional view of one example of an inflatable bag according to this invention showing its deployed state.

In FIG. 1, one example of an inflatable bag for airbag passive restraint systems for driver is illustrated in its deployed state, which comprises a lower base cloth 1 having a central opening 1a through which to communicate with an inflator 11 of the system and an upper base cloth 2 adapted to face toward a seated occupant, both cloths being seamed together at their outer peripheral portions 1d, 2d. The upper base cloth 2 and the lower base cloth 1 assume a generally circular planar form and have the same diameter.

The bag is further provided therein a plurality of lateral regulating members 4 in strap form having a shorter length than the radial distance between the outer peripheral portions 1d, 2d and an inner peripheral portion 1b around the opening 1a of the lower base cloth 1, which members each radially extend to link the inner peripheral portion 1b and the outer peripheral port ions 1d, 2d. The lateral regulating members 4 are thus located in a circumferentially spaced relation centering on the inner peripheral portion 1b of the lower base cloth 1, thereby sagging the lower base cloth 1 between the outer and inner peripheral portions 1d, 1b to form a circumferentially extending sag portion 6.

Because of this construction, the lateral regulating members 4 function to regulate inflation of the bag in the upward and lateral directions and thereby to cause downward inflation.

The size of the sag portion 6 can be varied optionally depending upon the length of the lateral regulating members 4, and the length of the regulating members 4 is preferably in the range of ca. 80 to 30% the radial distance between the outer and inner peripheral portions 1d, 1b or 2d, 1b.

The inner peripheral portion 1b and the outer peripheral portions 1d, 2d are places to be subjected to sewing. The regulating members 4 can be sewn together on both cloths 1, 2 simultaneously upon sewing of the places, and consequently, the inflatable bag is highly advantageous in producing it and rendering it strong.

The connecting places of the lateral regulating members 4 are not limited to the inner peripheral portion 1b and the outer peripheral portions 1d, 2d, and may be deviated more or less from the former place and/or the latter place.

Figure 2:
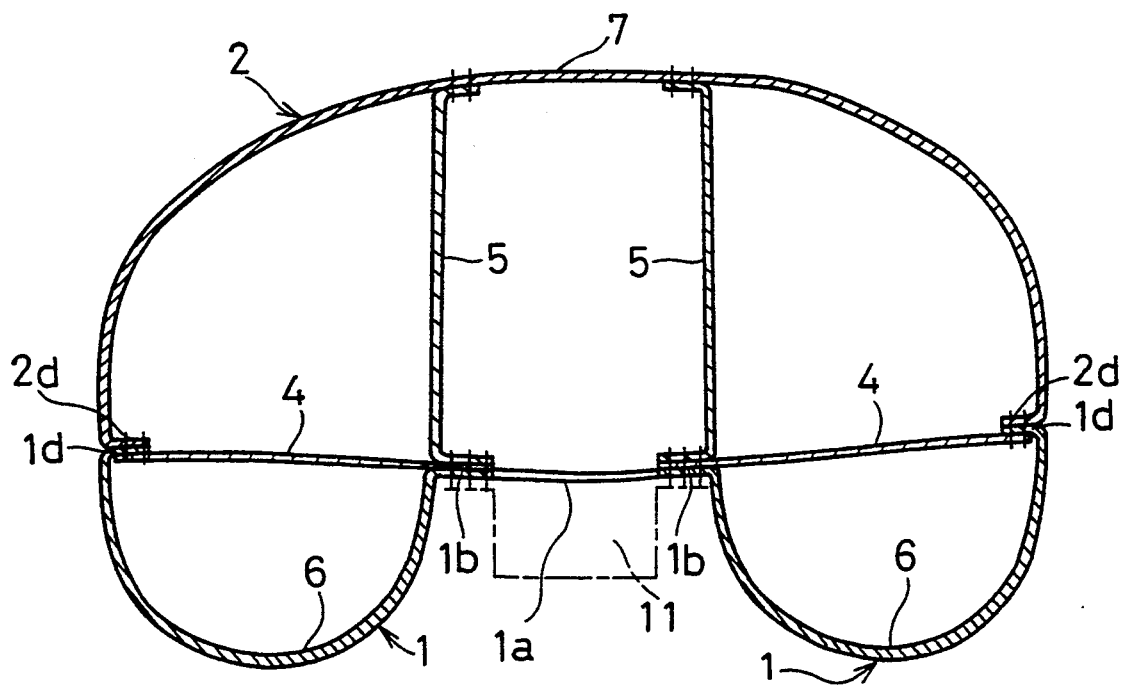
FIG. 2 is a vertical sectional view of another example of an inflatable bag of this invention showing its deployed state.

Another example of inflatable bag is shown in FIG. 2, which is constructed further to restrict upward inflation of the bag toward the occupant, in addition to the construction shown in FIG. 1. That is, a plurality of upward regulating members 5 in strap form for restricting upward flaring of the bag are provided to extend upwardly from the inner peripheral portion 1b of the lower base cloth 1 to a ring-like portion delimiting a central circular portion 7 of the upper base cloth 2 in a circumferential manner.

The formation of the lateral regulating strap members 4 produces more or less a sagging portion also on the upper base cloth 2, but in this embodiment, the upward regulating strap members 5 serve to restrict the magnitude of flaring of the upper base cloth 2, and consequently, it is possible to deploy effectively the bag to a more preferable shape for good protection.

Figure 13:
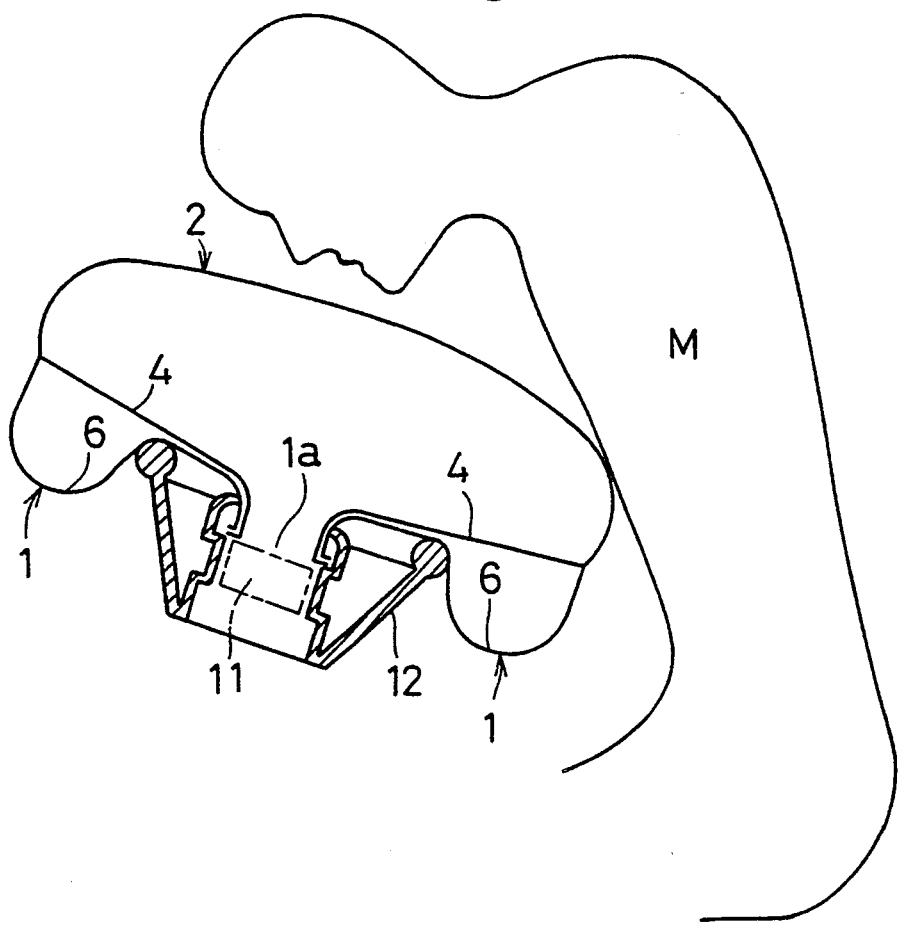
FIG. 13 and FIG. 14 are schematic vertical sectional views showing the operation states of the bags shown in FIG. 1 and FIG. 4, respectively, mounted on a steering wheel.

In the inflatable bags of the embodiments shown in FIGS. 1 and 2, since the sagging portion 6 is formed on the lower base cloth 1 in a wholly circumferential manner, when the bag is mounted in a steering wheel 12 and deployed, the sagging portion 6 is bulged sideways out of the steering wheel in a manner surrounding the wheel 12 around its lateral periphery, as shown in FIG. 13. That is, a bulged part of the bag, which is formed around the outer circumference of the steering wheel 12 and comprises the sag portion 6, is interposed between the occupant M and the steering wheel 12.

Figure 3:
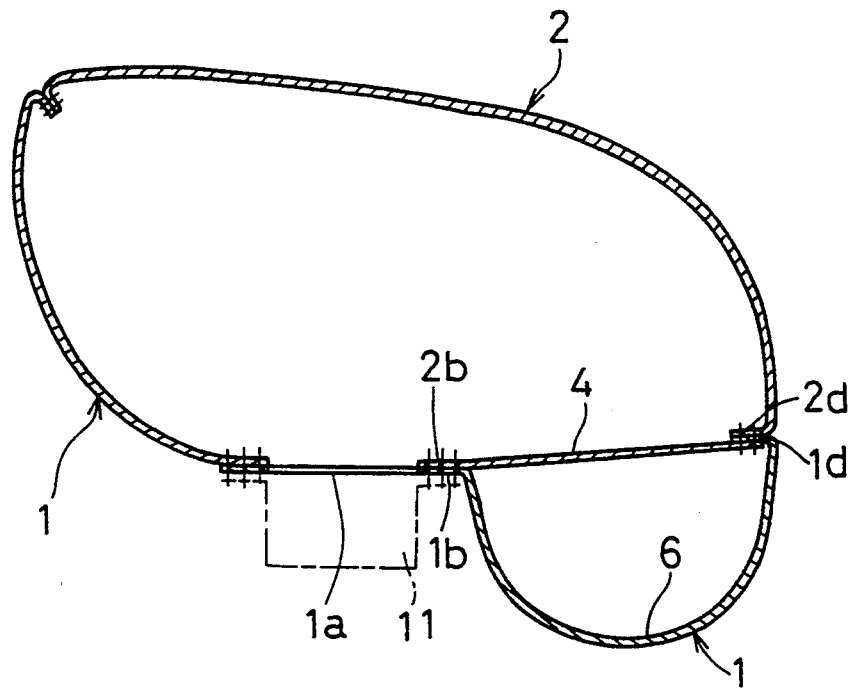
FIG. 3 is a vertical sectional view of further example of an inflatable bag of this invention in its deployed state.

FIG. 3 shows a further example of inflatable bag whose construction is similar to that of the inflatable bag illustrated in FIG. 1 except that the lateral regulating strap member or members 4 are disposed in the range of a half the circumference to one fourth the circumference of the upper and lower base cloths (i.e. between 180° and 90°), in a circumferentially spaced relation. The area in which the lateral regulating member or members 4 are disposed must be on the occupant's seat side.

Figure 4:
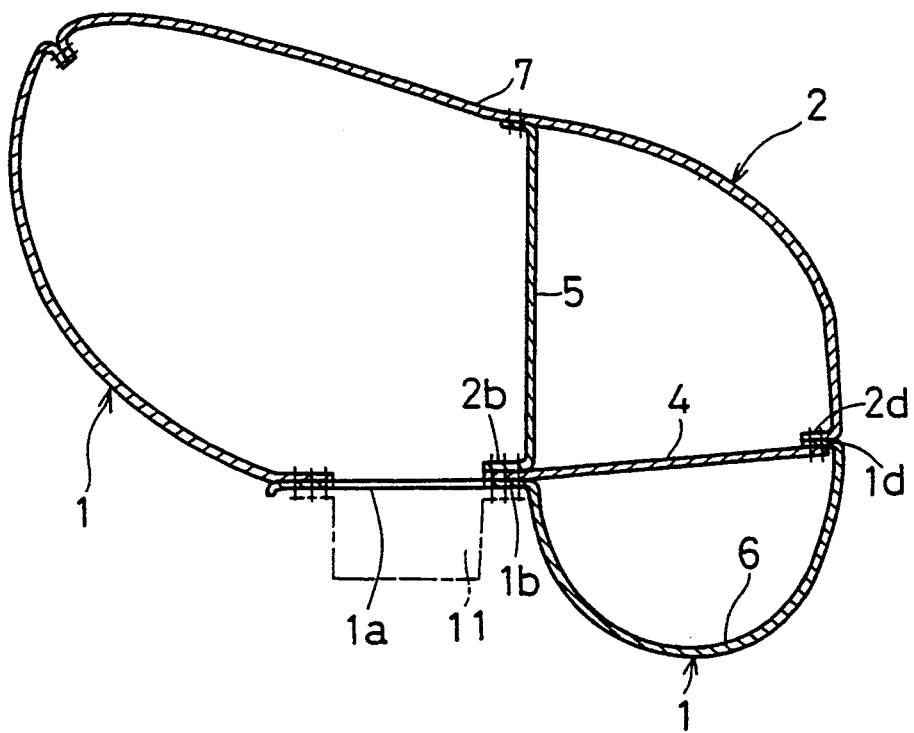
FIG. 4 is a vertical sectional view showing still further example of an inflatable bag of this invention in its deployed state.

FIG. 4 shows a still further example of inflatable bag, in which upward regulating strap member or members 5 for restricting upward extension of the bag are further disposed within the range of ½ to ¼ the circumference of both cloths in the area in which the lateral regulating member or members 4 are provided.

Any variation can be naturally made to the embodiments shown in FIGS. 3 and 4, and accordingly, it is possible to provide the lateral and the upward regulating members in the range of above one half the circumference or below one fourth the circumference, whenever necessary.

Figure 14:
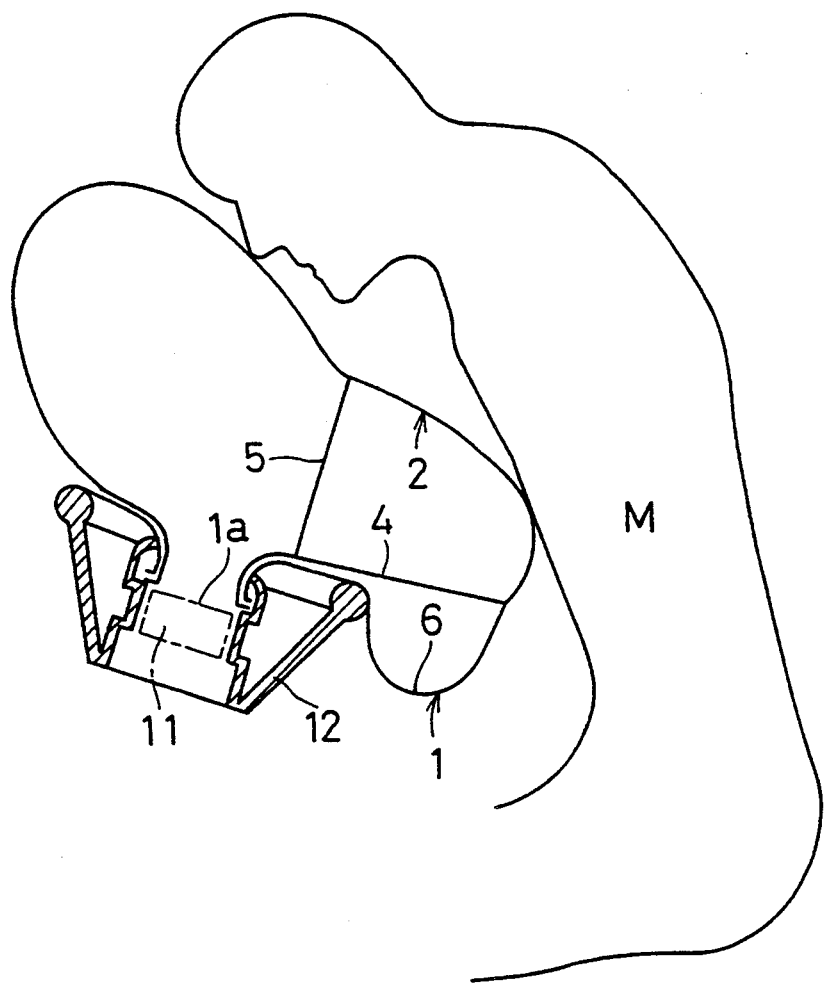

In these embodiments in which the lateral regulating means 4 is provided partially circumferentially, the sag portion 6 is formed on the lower base cloth 1 in a partially circumferential manner. When the bag is inflated and deployed, the sag portion 6 flares out of the steering wheel 12 on the side of the occupant M to surround the outer circumference, on the occupant side, of the steering wheel 12, as shown in FIG. 14. Further, in the preferred embodiments shown in FIGS. 3 and 4, since the lateral regulating member or members 4 are not provided in the opposite side to the occupant side, the bag is inflated in a configuration with such a bulging and height that it can receive the occupant M as shown in FIG. 14.

Since numerous modifications and changes of the bag will readily occur to those skilled in the art, it is not desired to limit the invention to the exact construction and operation shown and described.

The inflatable bag for driver shown in FIG. 1 can be manufactured, for example, in a method shown in FIGS. 6 to 9 whereas the bag for driver of FIG. 2 can be manufactured, for example, in a method shown in FIGS. 6, 7, 10, 11, 12.

Figure 5:
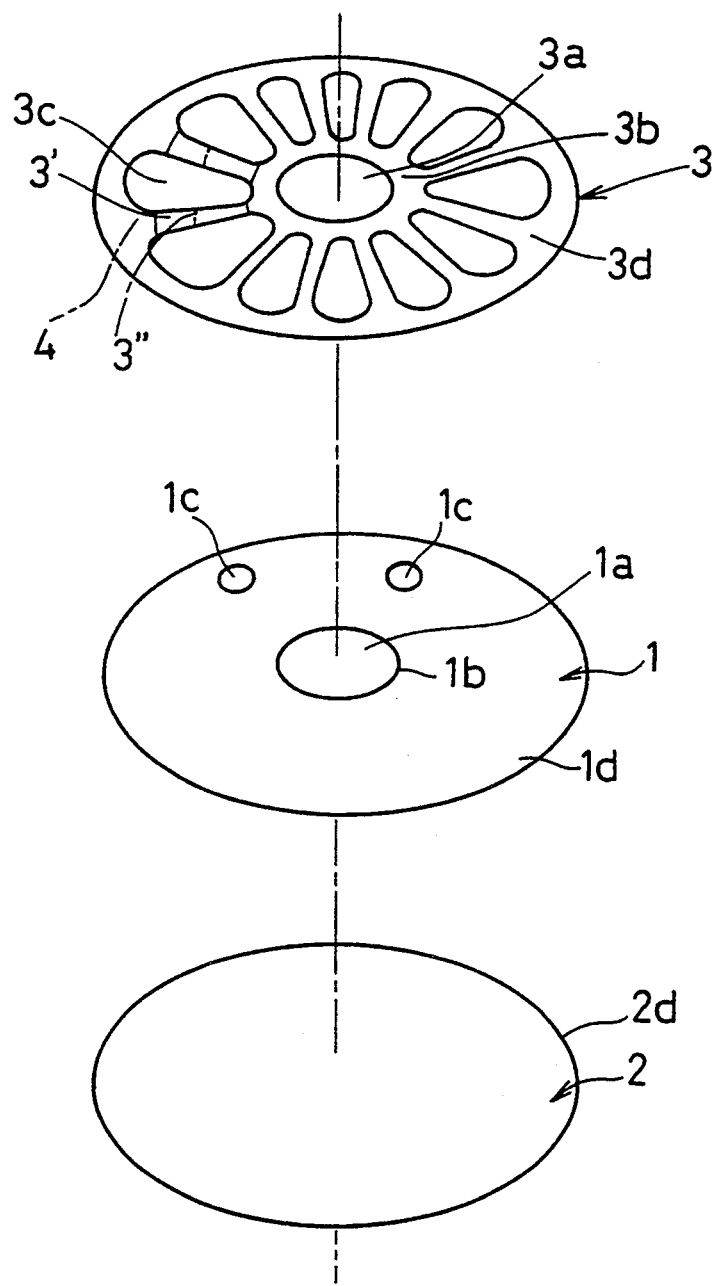
FIG. 5 is an illustrative representation showing starting materials used for one example of a method of manufacturing the bag shown in FIG. 1 or FIG. 2 pertaining to this invention.

FIG. 5 shows starting materials used for both procedures for the production of the bags illustrated in FIG. 1 and 2, namely, the lower base cloth 1 of circular form having the central opening 1a and vent holes 1c, the upper base cloth 2 having the same diameter and form as the former, and a third cloth 3 having the same form and size and the same central opening 3a as the lower base cloth 1, from which the lateral regulating means 4 only or both regulating members 4, 5 are to be subsequently made. The third cloth 3 has, in FIG. D, a plurality of communicating holes 3c of sector-like form apertured in a circumferentially spaced relation to form a plurality of strap-like portions 3' therebetween.

Figure 6:
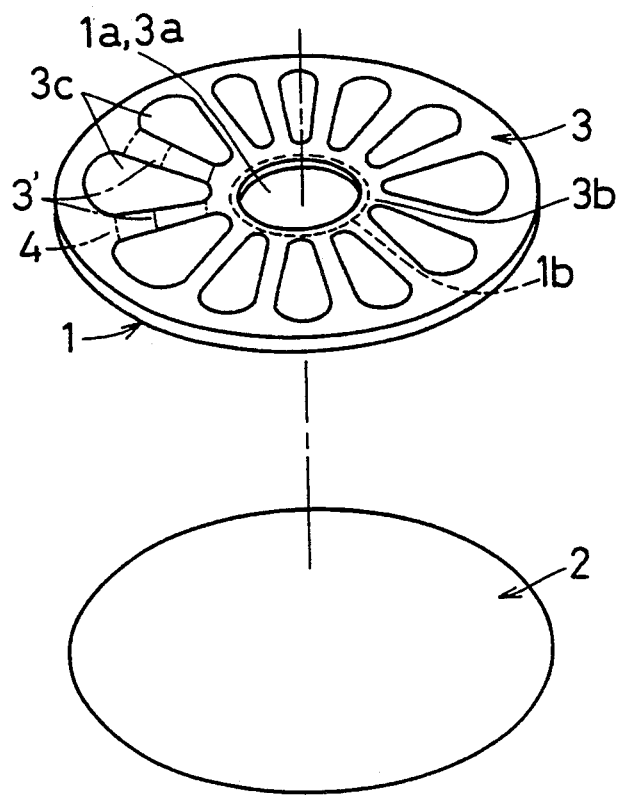
FIG. 6 to FIG. 12 are schematic illustrations showing the sequential process steps of the aforesaid methods for producing the inflatable bags of FIG. 1 and FIG. 2, with FIGS. 6 and 7 being schematic perspective views for both bags in steps (a) and (b), FIGS. 8 and 9 being vertical sectional views for the bag of FIG. 1 in steps (c) and (e), and FIGS. 10 to 12 being vertical sectional views for the bag of FIG. 2 in steps (c) (d) (e)
Figure 7:
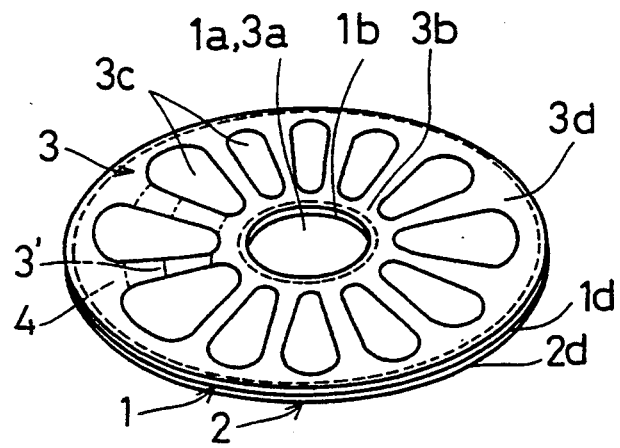

The inflatable bag shown in FIG. 1 can be produced as follows:

First, as shown in FIG. 6, the third cloth 3 is superposed on the lower base cloth 1 at its reverse side, and an inner peripheral portion 3b of the third cloth 3 and the inner peripheral port ion 1b of the lower base cloth 1 are seamed together along with a reinforcing cloth (not shown). The lower base cloth 1 having thereon the third cloth 3 is superposed onto the upper base cloth 2 so that both obverse sides thereof may face to each other, and respective outer peripheral portions 3d, 1d, 2d of the third cloth 3, lower base cloth 1 and upper base cloth 2 are seamed together as shown in FIG. 7.

Figure 8:
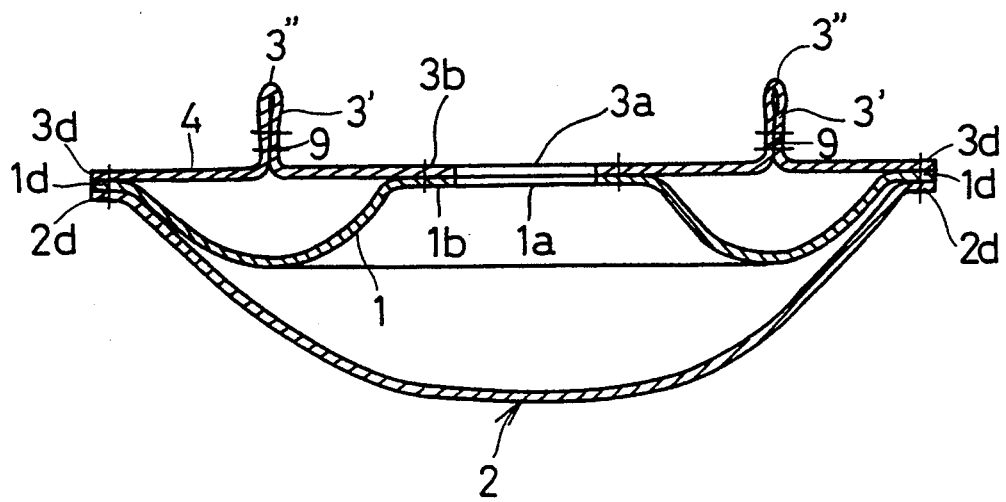

Then, on the uppermost third cloth 3, each of the strap-like portions 3' located near the inner peripheral portion 3b is folded circumferentially into two by picking up a bisecting portion 3'' thereof so that the resulting radial length between the outer and inner peripheral portions 3d, 3b may be in the range of 80-30% the original radial length before folding and the folded strap-like portion 3' is shortened in length by seaming its two roots 9 together, whereby the lateral regulating strap members 4 are formed (FIG. 8).

Figure 9:
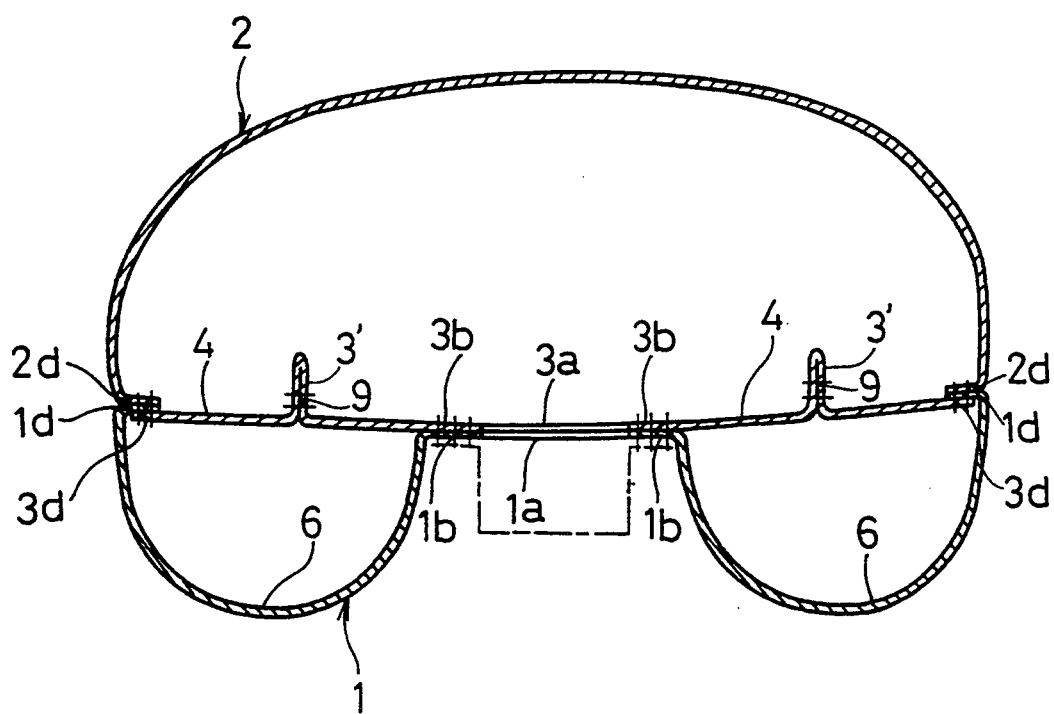

Finally, the base cloths 1, 2 with the obverse sides being inside are reversed and turned the obverse sides inside out. Thus, the bag is completed as shown in FIG. 9.

With the inflatable bag shown in FIG. 3 or the like in which the lateral regulating means 4 is partly located, the third cloth 3 is made to have corresponding construction to the partial location, form, and number of the lateral regulating means 4. For example, a third cloth 3 for the bag of FIG. 3 is formed so that a sector-form hole is defined in the area of 180°-270° and strap-like portions 3' are formed in the area of 180°-90° to define small sector-form holes therebetween. From this third cloth, lateral regulating strap members 4 are formed.

Figure 10:
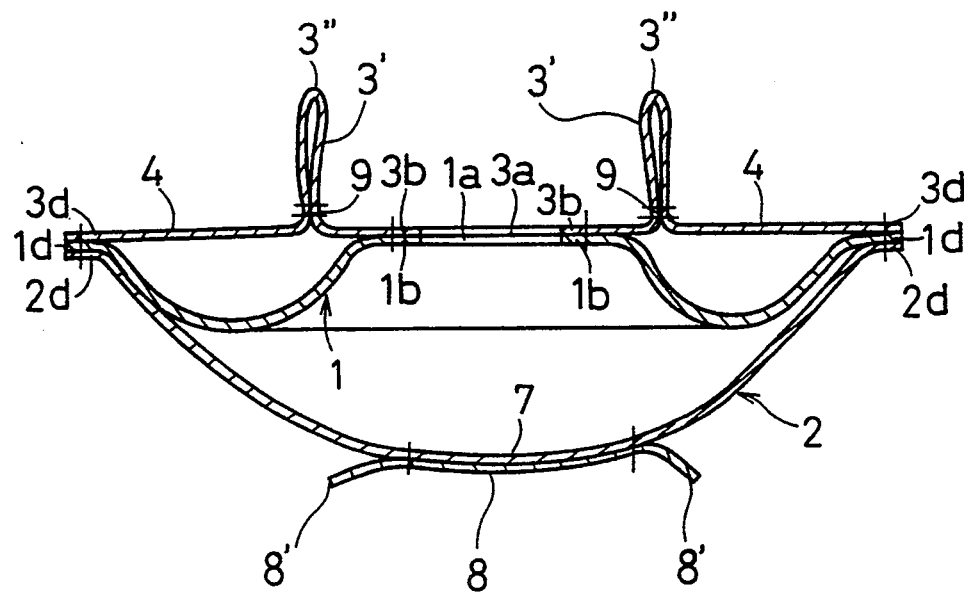
Figure 11:
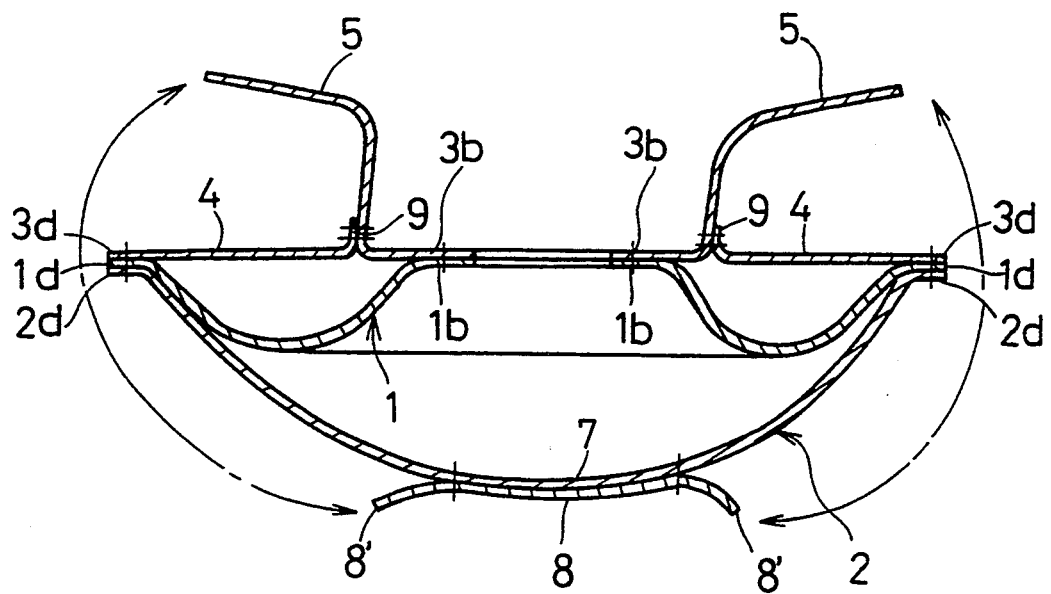

The bag shown in FIG. 2 can be produced, in the first and second steps, according to the same steps as those for the production of the bag of FIG. 1 above. Thereafter, in the step as shown in FIG. 10 which is similar to the step shown in FIG. 8, each of the strap-like portions 3' located near the inner peripheral portion 3b is folded in the circumferential direction into two by raising the bisecting portion 3" so that the resulting radial length between the outer and inner peripheral port ions 3d, 3b may be in the range of 80-30% the original length before folding and the folded strap-like portion 3' is shortened in length by seaming its two roots 9 together. The folded and seamed strap-like portions 3' are each cut at one root 9 and the resulting strap 5 having one free end is connected to the central circular portion 7 of the upper base cloth 2 along its ring portion, as shown in dot-and-dash lines in FIG. 11.

The connection of the straps 5 to the upper base cloth 2 may be made directly or through a circular cloth 8 which is sewn to the central circular portion 7 of the upper base cloth 2 at its reverse side and has a ring-like free perimeter 8' as shown in the embodiment. The latter connecting means is more advantageous in sewing efficiency. Thus the upward regulating strap members 5 are formed together with the lateral regulating members 4.

Figure 12:
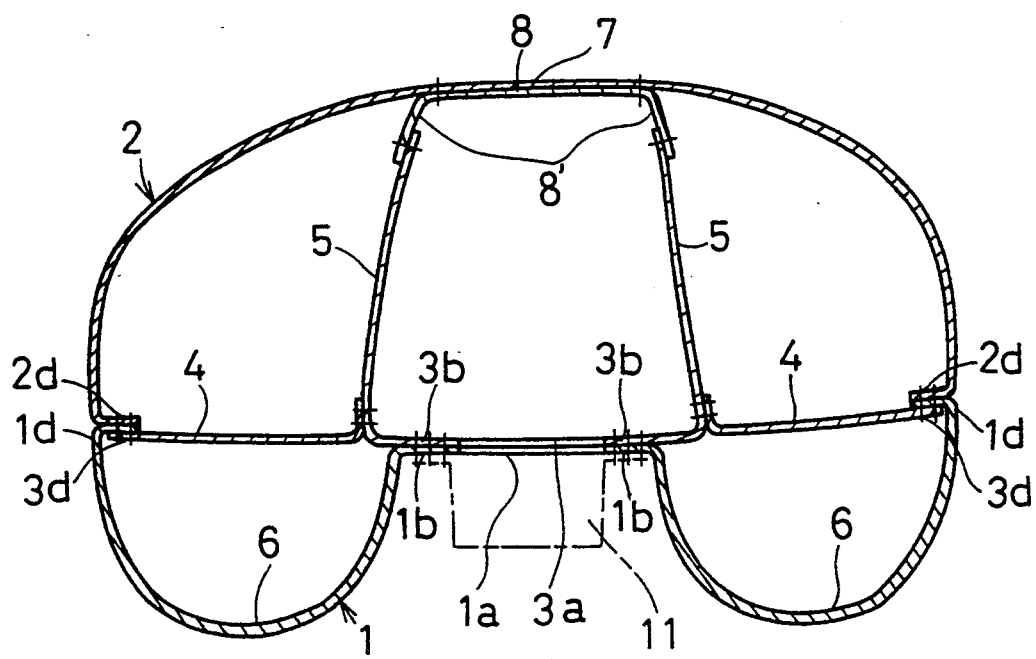

Lastly, the respective base cloths 1, 2 so far sewn with the reverse sides being outside are reversed by passing the central part of the upper base cloth 2 through the openings 1a, 3a and turned the obverse sides of the cloths inside out, whereby the bag is completed as shown in FIG. 12.

The bag shown in FIG. 4, which is a variant of the bag shown in FIG. 2, can be produced similarly according to the procedure for producing the bag of FIG. 2, by using the third cloth 3 for use in the bag of FIG. 3 as described above.

Although several preferred embodiments have thus been described, it should be understood that this invention is in no sense limited thereby.

As described above, the inflatable bags for driver for use in airbag passive restraints according to this invention are characterized by the provision of the lateral regulating means having a shorter length than the radial distance between the outer and inner peripheral portions of the both cloths which means is disposed in a circumferentially spaced relation to connect both peripheral portions whereby a saw portion is formed on the lower base cloth. Because of the construction, when the bag is fitted to an airbag passive restraint system and fully deployed, the lateral regulating means functions to regulate the inflation of the bag in the upward and lateral directions and to cause downward bulging of the sag portion. As a consequence, the bag flares sideways out of the steering wheel in a manner surrounding it.

On the other hand, the method of producing the bag having lateral regulating means or both regulating means is characterized by using a third cloth of the same size and form as both upper and lower base cloths, from which third cloth the lateral regulating means or both can be made. Consequently, the method enables to reduce greatly the number of starting materials and number of sewing places, and hence can be carried out simply and efficiently.

What is claimed is:

1. An inflatable bag for an airbag passive restraint system of a vehicle, comprising:

a generally circular upper base cloth;

a lower base cloth of generally the same size and shape as the upper base cloth, said upper and lower base cloths being seamed together at respective outer peripheral portions thereof and being adapted to face toward the driver and to be connected to an inflator for releasing gas into the inflatable bag for inflation thereof, said lower base cloth having a central opening through which to communicate with the inflator; and lateral regulating means for regulating the inflation of the bag in lateral and upward directions and causing downward inflation in a lower area of the bag, said lateral regulating means having a length which is shorter than a radial distance between the outer peripheral portions of both cloths and an inner peripheral portion around the central opening of the lower base cloth, said lateral regulating means extending radially to link the inner peripheral portion of the lower base cloth and the outer peripheral portions of both cloths in a mutually opposing manner to shorten a radial distance between the inner and outer peripheral portions thus forming, in a non-inflated state, a circumferential sag portion which enables downward inflation of the lower base cloth.

2. The inflatable bag as set forth in claim 1, wherein said lateral regulating means includes a plurality of strap members disposed in a circumferentially spaced relation.

3. The inflatable bag as set forth in claim 1, wherein said lateral regulating means includes at least one laterally regulating strap member disposed within the range of ½ to ¼ the circumference of both cloths.

4. An inflatable bag as set forth in claim 1, further comprising upward regulating means for restricting an upward flaring of the bag, said upward regulating means extending upwardly from the inner peripheral portion of the lower base cloth to a central circular portion of the upper base cloth, said upward regulating means including at least one strap member.

5. The inflatable bag as set forth in claim 4, wherein said upward regulating means includes a plurality of strap members disposed in a whole circumferential area of the inner peripheral portion and the central circular portion in a circumferentially spaced relation.

6. The inflatable bag as set forth in claim 3, further comprising an upward regulating means having at least one upwardly regulating strap member disposed in the range of ½ to ¼ the circumference of both cloths in the same circumferential area as the lateral regulating means.

7. The inflatable bag as set forth in claim 1, wherein said lateral regulating means has a length of 30–80% the radial distance between the outer peripheral portions of both cloths and the inner peripheral portion of the lower base cloth.

8. The inflatable bag as set forth in claim 4, wherein said lateral regulating means has a length of 30–80% the radial distance between the outer peripheral portions of both cloths and the inner peripheral portion of the lower base cloth.

9. A method of producing an inflatable bag having an upper base cloth, a lower base cloth of generally the same size and form as the upper base cloth and having a central opening through which to communicate with an inflator, a lateral regulating means for regulating inflation of the bag in lateral and upward directions and causing downward inflation in a lower area thereof, and a third cloth having the same size and form as the upper and lower base cloths and the same central opening as the lower base cloth, the third cloth forming the lateral regulating means and having at least one strap-like portion, the strap-like portion extending radially from the central opening to a radial outer edge of the third cloth and having at least one longitudinal edge of the strap-like portion defined by a communicating hole through the third cloth, which method comprises the steps of:
  superposing the third cloth on a reverse side of the lower base cloth and seaming inner peripheral portions of the third and lower cloths around the respective central openings;
  superposing the lower base cloth on the upper base cloth so that an obverse side of the lower base cloth may face an obverse side of the upper base cloth and seaming outer peripheral portions of the third, lower base and upper base cloths together;
  picking up and raising the at least one strap-like portion of the third cloth to fold the strap-like portion in a circumferential direction into two and seaming the folded strap-like portion at two roots thereof, thus forming the lateral regulating means; and
  subsequently, turning the obverse sides of the upper and lower base cloths inside out.

10. A method of producing an inflatable bag having an upper base cloth, a lower base cloth of generally the same size and form as the upper base cloth and having a central opening through which to communicate with an inflator, a lateral regulating means for regulating inflation of the bag in lateral and upward directions and causing downward inflation in a lower area thereof, an upward regulating means for restricting an upward flaring of the bag, and a third cloth having the same size and form as the upper and lower cloths and the same central opening as the lower base cloth, the third cloth forming the lateral regulating means and the upward regulating means and having at least one strap-like portion, the strap-like portion extending radially from the central opening to a radial outer edge of the third cloth and having at least one longitudinal edge of the strap-like portion defined by a communicating hole through the third cloth, which method comprises the steps of:
  superposing the third cloth on a reverse side of the lower base cloth and seaming inner peripheral portions of the third and lower cloths around the respective central openings;
  superposing the lower base cloth on the upper base cloth so that an obverse side of the lower base cloth may face an obverse side of the upper base cloth and seaming outer peripheral portions of the third, lower base and upper base cloths together;
  picking up the at least one strap-like portion of the third cloth to fold the strap-like portion in a circumferential direction into two and seaming the folded strap-like portion at two roots thereof, thus forming the lateral regulating means;
  cutting one root of the folded strap-like portion to form an unfolded strap having a free end and seaming the free end to a central circular portion of the upper base cloth at a reverse side of the upper base cloth thereby forming the upward regulating means; and
  subsequently, turning the obverse sides of the upper and lower base cloths inside out.

11. An inflatable bag as set forth in claim 3, wherein said lateral regulating means includes a plurality of laterally regulating strap members disposed within the range of $\frac{1}{2}$ to $\frac{1}{4}$ the circumference of both cloths, the strap members being disposed in a circumferentially spaced relation.

12. An inflatable bag as set forth in claim 6, wherein said lateral regulating means and said upward regulating means each include a plurality of laterally regulating strap members and upwardly regulating strap members, respectively, the respective strap members being disposed in a circumferentially spaced relation.

13. An inflatable bag as set forth in claim 1, wherein said vehicle includes a steering wheel and a means central of the steering wheel for deploying said inflatable bag, and wherein said lateral regulating means, upon inflation of said bag results in an orientation of said sag portion radially outside of a radially outer perimeter of said steering wheel so that the inflation of said sag portion will cause said sag portion to be oriented between a vehicle operator and said steering wheel.

* * * * *